United States Patent [19]

Geronimi

[11] Patent Number: 5,542,081
[45] Date of Patent: Jul. 30, 1996

[54] IC CARD DESIGNED TO RECEIVE MULTIPLE PROGRAMS IN A PROGAMMABLE MEMORY

[75] Inventor: Francois Geronimi, Aix en Provence, France

[73] Assignee: Gemplus Card International, Gemenos, France

[21] Appl. No.: 294,098

[22] Filed: Aug. 22, 1994

Related U.S. Application Data

[63] Continuation of Ser. No. 768,028, Sep. 30, 1991, abandoned.

[30] Foreign Application Priority Data

Oct. 2, 1990 [FR] France .................................. 90 12115

[51] Int. Cl.$^6$ ...................................... G06K 19/06
[52] U.S. Cl. .................... 395/800; 235/380; 235/492; 235/381; 395/182.05
[58] Field of Search ................. 395/800, 182.05; 235/380, 492, 487, 381

[56] References Cited

U.S. PATENT DOCUMENTS

| 4,028,684 | 6/1977 | Divine et al. | 340/172.5 |
| 4,542,453 | 9/1985 | Patrick et al. | 395/375 |
| 4,734,568 | 3/1988 | Watanabe | 235/487 |
| 4,802,119 | 1/1989 | Heene et al. | 395/182.05 |
| 4,827,512 | 5/1989 | Hirokawa et al. | 380/23 |
| 4,829,169 | 5/1989 | Watanabe | 235/492 |
| 5,252,812 | 10/1993 | Nakamura | 235/380 |

*Primary Examiner*—Alyssa H. Bowler
*Assistant Examiner*—John Follansbee
*Attorney, Agent, or Firm*—Roland Plottel

[57] ABSTRACT

An integrated circuit, for use in a microprocessor-based chip card that provides several different functions at different hierarchical levels. The circuit has a microprocessor, a read-only memory managing a protection system and an EEPROM capable of containing not only data but also a code that can,be executed by the microprocessor. Different programs are placed in the EEPROM memory zones (Z1C, Z2C, Z3C). The read-only memory contains filtering instructions used to read a filter address in a specified zone Z1B, Z2B, Z3B of the EEPROM. Depending on the contents of this zone, the program will be routed, or not routed, towards the zones (Z1C, Z2C, Z3C). Thus information is recorded at only one address of the EEPROM in order to control accessibility to the different functions of the circuit.

6 Claims, 1 Drawing Sheet

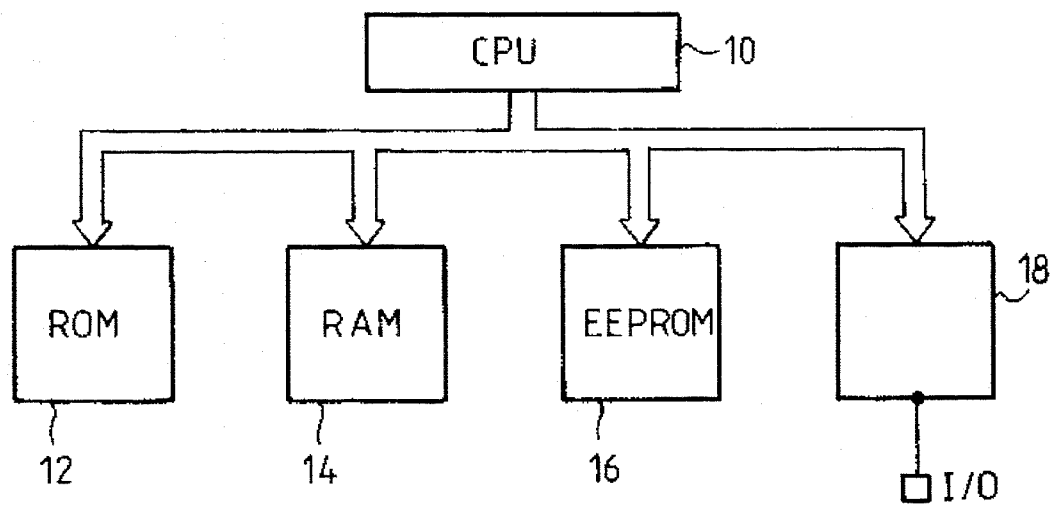
FIG_1
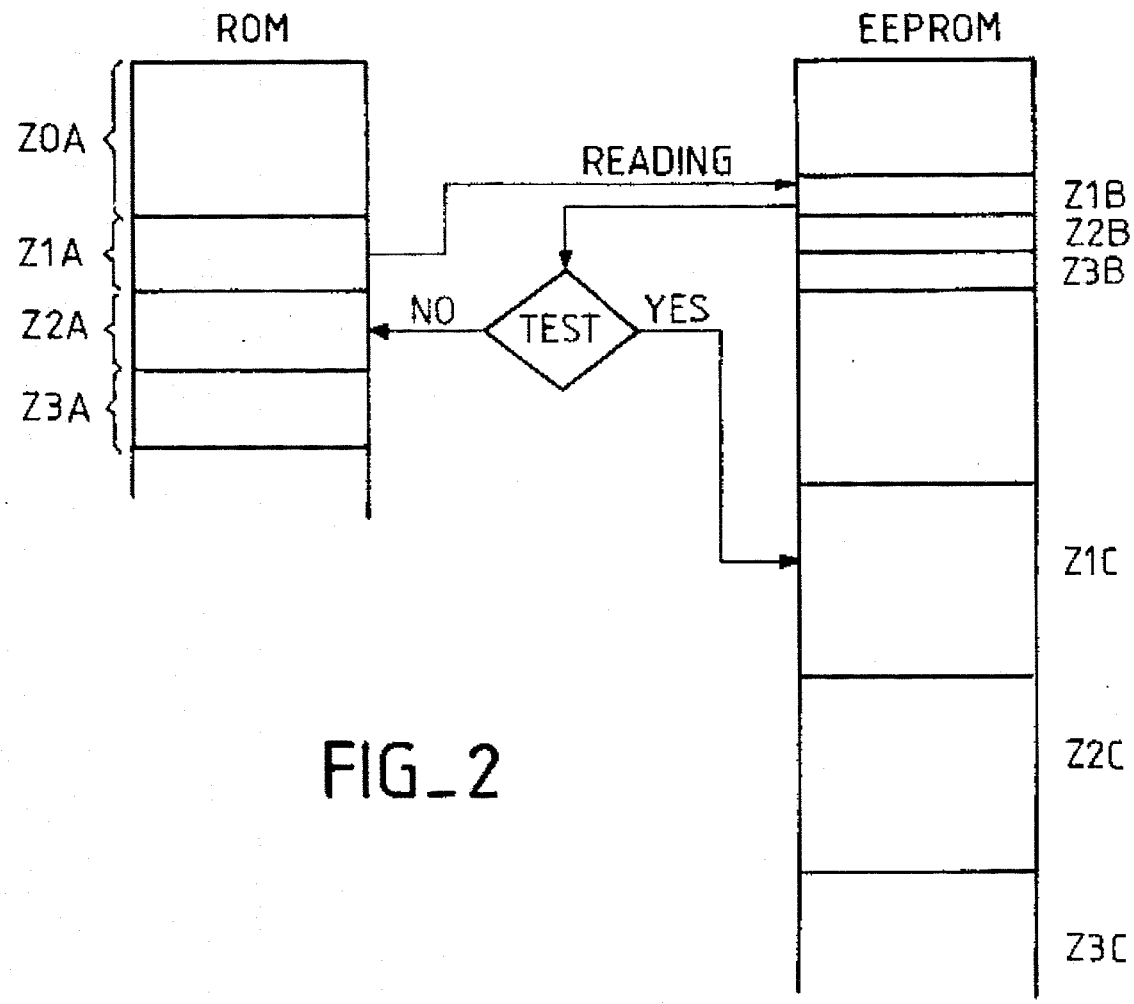
FIG_2

IC CARD DESIGNED TO RECEIVE MULTIPLE PROGRAMS IN A PROGAMMABLE MEMORY

This application is a continuation of application Ser. No. 07/768,028, filed Sep. 30, 1991, now abandoned.

BACKGROUND OF THE INVENTION

The invention relates to chip cards and, more especially, to cards in which the integrated circuit chip comprises not only a microprocessor and a program read-only memory (that cannot be changed) but also an electrically programmable memory that is capable of storing not only data but also a code that can be executed by the microprocessor.

These memory cards are useful notably for applications having a hierarchy of several possible functions. For example, the manufacturer of the integrated circuit chip will set up programs for the operation of the microprocessor at a first level of functions. In particular, he will set up all the programs of the read-only memory which are definitively fixed. The chip card manufacturer who incorporates the integrated circuit into his card will set up a second level of functions. The institution (the bank or purveyor of services) which is the customer of the chip card manufacturer will set up a third level of functions, and the final user (the customer of the purveyor of services) will finally be able to use a fourth level of functions. This theoretical hierarchy is given only as an example.

According to the invention, a particularly easy means has been found, making it possible to have several different functions that are accessible to different levels of use.

SUMMARY OF THE INVENTION

According to the invention, there is provided an integrated circuit comprising, in addition to a microprocessor and a read-only memory, an electrically programmable memory capable of containing a code that can be executed by the microprocessor, and further including the following:

- in the read-only memory, several instructions known as filtering instructions that can be carried out by the microprocessor to read the contents placed at a first specified address, called a "filter address", of the electrically programmable memory,
- means to verify whether the contents placed at the filter address represent an address of the electrically programmable memory, located within limits, this address being called a "sub-program address",
- means to make the microprocessor carry out a sub-program of instructions contained in the electrically programmable memory from this sub-program address, provided that this address is within the limits, and means to continue the program of the read-only memory if this is not the case, the latter program containing several successive filtering instructions, each corresponding to a different respective filter address in the electrically programmable memory and to limits that are different for each filtering instruction.

The invention therefore proposes a general organization of the memories of the chip by which setting up of several applications at different levels can be controlled as desired and in a very simple way.

BRIEF DESCRIPTION OF THE DRAWING

Other features of the invention shall appear from the following detailed description, made with reference to the appended figures, of which:

FIG. 1 gives a very schematic view of the general organization of an integrated circuit chip of a microprocessor-based chip card;

FIG. 2 represents the organization of the memory in an integrated circuit chip according to the invention.

DETAILED DESCRIPTION OF THE INVENTION

A standard integrated circuit of a chip card is shown in FIG. 1. It has, firstly, a central processing unit (CPU) 10 and all the associated peripheral resources:

- a read-only memory (ROM) 12 containing instructions that can be carried out by the microprocessor and, notably, the programs for the management of the memories and for protecting access to the card;
- a random-access memory (RAM) 14;
- an ultra-violet light erasable electrically programmable memory (LEPROM) 16, or better still a FLASH EPROM or an electrically erasable PROM; this memory may include not only data but also a code capable of being executed (with instructions that can be executed by the microprocessor);
- input/output ports 18 enabling exchanges with the exterior of the card, these exchanges being provided in principle by a very small number of input/output contacts I/O.

The invention relates especially to an example where the hierarchically organized application programs should be capable of being executed by the microprocessor: a program of a higher hierarchical level must necessarily be carried out before a program of the next hierarchical level.

According to the invention, it is provided that the integrated circuit and its ROM and EPROM or EEPROM memories will be organized as follows: first of all, it is the read-only memory that manages cases of authorization of access to the EEPROM memory in both reading and writing modes. Then, zones of the EEPROM, at addresses called "filtering addresses", are reserved for containing other addresses which shall be called "sub-program addresses". Finally, through one sub-program address, the EEPROM contains a sub-program that can be carried out by the microprocessor. It is this sub-program whose use is controlled according to the invention.

FIG. 2 shows this organization. The ROM contains a code that can be executed sequentially under the control of a counter (not shown), i.e. the instructions are carried out successively in the order of the successive addresses of the memory (apart from various branch and jumps). A zone Z0A of the ROM contains, for example, a program for the initialization of the card (various tests, checks on security, the zero-setting of the registers, etc.) which is carried out at the beginning stages of the use of this card.

After the zone Z0A, a zone Z1A contains a filtering instruction that makes it possible to check the presence (and the possibility of use) of a first sub-program in the EEPROM. The filtering instruction is a small sub-program that can be carried out by the microprocessor and defines means in order to:

- go and read a set of contents, in the EEPROM, at a specified address (an address of a zone Z1B of the EEPROM memory); this address is fixed since it is the read-only memory that defines it;
- verify that the address Z1B is an address of the EEPROM, this address being contained between specified limits which notably encompass a zone Z1C of the EEPROM;

if this is the case, to go to the specified address; if not, to go to the following address Z2A of the ROM. At the specified address, it is the sub-program present in the zone Z1C of the EEPROM that will be carried out.

Several successive filtering instructions are thus contained in successive zones of the ROM. Each of them corresponds to a respective application sub-program of the EEPROM memory.

In the example shown there are, for example, three successive filtering instructions in the ROM, in successive zones Z1A, Z2A, Z3A of this memory.

The instruction of the zone Z1A refers to a filtering address Z1B of the EEPROM and this instruction contains the limits (in the read-only memory) i.e. within which the contents of the zone Z1B should be located so that the sub-program corresponding to this filtering instruction is carried out. This sub-program is contained in the zone Z1C.

In the same way, the filtering instruction Z2A corresponding to the program of the next hierarchical level (which will be carried out only after the execution of the sub-program of the zone Z1C or after a negative result at the first filtering) activates the reading of a zone Z2B that is different from the zone Z1B. The sub-program corresponding to this zone is stored in the zone Z2C. However, the microprocessor carries out the program of the zone Z2C only if the contents of the address Z2B constitute an address located within fixed predetermined limits in the ROM. These limits are not the same as for the filtering instruction of the zone Z1A, so that blocks are reserved in the EEPROM, through the fixed data in the ROM, each block corresponding to a determined level of hierarchical filtering (in the order of execution of the filtering instructions of the ROM).

Finally, the filtering instruction of the zone Z3A further defines yet other limit values, hence another block in which the third level sub-program should be located, i.e. in a zone Z3C of the EEPROM. Here again, the test will be positive or negative depending on the contents that have been stored in the EEPROM at the address Z3B.

When the decision to permit the use of one sub-program or another has been taken, all that will remain to be done will be to store address values in the EEPROM, in the zones Z1B, Z2B, Z3B, said address values corresponding to the start of the zones containing the application sub-programs that should effectively be put into operation. For those application sub-programs that should not be put into operation, zero or invalid values will be stored in the sub-program address zones Z1B, Z2B or Z3B, namely values which, in any case, do not correspond to possible routings towards unauthorized sub-programs.

Access towards the zones Z1B, Z2B, Z3B may be reserved (in the context of the management of access protection by the ROM) according to a hierarchy of access, notably by the use of confidential codes. Thus, these zones, in principle, can no longer be modified by the users of an inferior level in the access hierarchy.

Thus, a description has been given of an integrated circuit organization that makes it possible to provide, in advance, for the addition of hierarchically organized supplementary, successive functions to the functions defined by the read-only memory. The control of the performance of these supplementary functions is very simple since it is based on the simple recording of a valid address in the EEPROM at an address that is itself specified.

What is claimed is:

1. An integrated circuit comprising a microprocessor, a read-only memory and an electrically programmable memory capable of containing a code that can be executed by the microprocessor, wherein said integrated circuit further includes the following:

in the read-only memory, several instructions known as filtering instructions that can be carried out by the microprocessor to read the contents placed at a first specified address, called a "filter address", located in a first zone of the electrically programmable memory, means to verify whether the contents placed at the filter address represent an address in a second zone of the electrically programmable memory, located within limits, this address being called a "sub-program address", means to make the microprocessor carry out a subprogram of instructions contained in the second zone of the electrically programmable memory from this sub-program address, provided that this address is within said limits, and means to continue the program of the read-only memory if this is not the case, the latter program containing several successive filtering instructions, each corresponding to a different respective filter address in the first zone of the electrically programmable memory and to limits that are different for each filtering instruction, and means for receiving access towards said predetermined locations (Z1B, Z2B, Z3B), according to a hierarchy of access, and wherein said hierarchy of access employs confidential codes, and access to a subsequent zone is preempted if certain conditions are not met.

2. The circuit according to claim 1, wherein in each of said first zone filter addresses in the first zone of the programmable memory consists of an address, which is either the address of a subprogram in the second zone of the programmable memory, or is a signal to return to read only memory.

3. An integrated circuit for a smart card comprising a ROM having sequentially arranged filter instructions;

an EEPROM having a first zone with several predetermined locations which contain either a filter addresses or a return to ROM signal, and a second zone having several locations each with a subprogram;

said filter instructions including addresses of said predetermined locations with one each predetermined location corresponding to one filter instruction, respectively;

said filter addresses including addresses of said locations of said subprograms;

means responsive to one of said filter instructions being interrogated for directing instruction to said corresponding predetermined location in said EEPROM; and means for determining if said interrogated location contains a filter address in said first zone and if it does, then for directing a signal from said first zone to said filter address in said second zone for execution of said subprogram in the location designated in said first zone interrogated filter address, and if it does not, then for directing a signal to said ROM to interrogate a next filter instruction, and means for receiving access towards said predetermined locations (Z1B, Z2B, Z3B), according to a hierarchy of access wherein said hierarchy of access employs confidential codes, and access to a subsequent zone is preempted if certain conditions are not met.

4. The circuit of claim 1 or 3, wherein each of said read only memory filter instructions consists of the address of the respective predetermined location in the first zone of said EEPROM.

5. The circuit of claim 1 or 3, wherein each of said predetermined locations (Z1B, Z2B, Z3B) in the EEPROM consists of a forwarding address, which is either the address of the subprogram in the second zone of the EEPROM (Z1C, Z2C, Z3C) or a signal to return to ROM.

6. The circuit of claim 1 or 3, wherein each of said predetermined locations (Z1B, Z2B, Z3B) in the first zone of the EEPROM consists of either a valid or an invalid address in the second zone of said EEPROM.

* * * * *